United States Patent Office 3,459,694
Patented Aug. 5, 1969

3,459,694
VULCANIZATION OF POLYCHLOROPRENES WITH EPOXIDES AND THIOUREAS
John Michael Bowman, Wilmington, Del., assignor to E. I. du Pont de Nemours and Company, Wilmington, Del., a corporation of Delaware
No Drawing. Continuation-in-part of application Ser. No. 451,669, Apr. 28, 1965. This application Oct. 16, 1967, Ser. No. 675,364
Int. Cl. C08c 11/54, 11/72; C08d 9/10
U.S. Cl. 260—23.7      7 Claims

ABSTRACT OF THE DISCLOSURE

A vulcanizable chloroprene polymer composition comprising about 100 parts of a chloroprene polymer, about 0.7 to 7.0 parts of an epoxide and about 0.5 to 5.0 parts of a substituted thiourea.

RELATED APPLICATION

This application is a continuation-in-part of co-pending application Ser. No. 451,669, now U.S. Patent No. 3,418,201.

BACKGROUND OF THE INVENTION

This invention relates to improved curing systems for elastomeric polymers of chloroprene. In particular it relates to curable chloroprene polymer compositions which contain an epoxy resin-substituted thiourea curing system.

It is known to employ substituted thioureas as accelerators in the vulcanization of chloroprene polymers as taught by U.S. Patent 2,958,680 to L. A. Brooks and J. C. Bacon. Vulcanizates of this sort show good physical properties, but unvulcanized, compounded polychloroprene stocks containing only the substituted thioureas as accelerators have been found to have very poor "bin stability," i.e., they cannot be stored after compounding and before vulcanizing without undergoing significant and undesirable change in their curing behavior. Practical manufacture of vulcanized rubber products demands good bin stability in unvulcanized compounds.

A further disadvantage of chloroprene polymer stocks having substituted thioureas incorporated as the sole vulcanization accelerators is that they do not have sufficient "processing safety," i.e., they are frequently subject to premature vulcanization during processing prior to curing. This is a serious problem in the manufacture of elastomeric articles since it does not allow sufficient time for the elastomers to be molded prior to vulcanization.

There has been a need in the art therefore, for a chloroprene polymer vulcanization system which has good bin stability and processing safety and gives vulcanizates having superior physical properties at least comparable to those obtained by the use of substituted thioureas alone.

SUMMARY OF THE INVENTION

According to this invention vulcanizable elastomeric compositions are provided which comprise in parts by weight about 100 parts of a chloroprene polymer, about 0.7–7.0 parts of an epoxy resin and about 0.5–5.0 parts of a substituted thiourea. It has also been discovered that the chloroprene polymer compositions which are cured according to this invention and have a mineral filler incorporated therein can be adhered directly to a fluoroelastomer to form a laminate as disclosed in applicant's copending application Ser. No. 451,669.

DETAILED DESCRIPTION

Chloroprene polymers suitable for use in the practice of this invention are the high molecular weight, mercaptan-modified polychloroprenes such as those disclosed in U.S. Patent 2,567,117. Copolymers of chloroprene with minor proportions, up to 20 weight percent, of comonomers such as 2,3-dichlorobutadiene-1,3, styrene, isoprene, acrylonitrile, and the like can also be used. The preferred polymers are the homopolymers of chloroprene, a representative example being neoprene prepared according to the method discolsed in U.S. 2,494,087 to Daniels, and chloroprene/2,3-dichlorobutadiene - 1,3 copolymers containing not more than 5 weight percent 2,3-dichlorobutadiene-1,3. The chloroprene polymers used have a number average molecular weight of at least 50,000 and normally are in the range of 100,000 to 400,000. They are substantially completely soluble in aromatic solvents such as benzene and toluene. In general, the sulfur-modified chloroprene polymers are not suitable in the practice of this invention.

Suitable epoxy resins for use in this invention include (1) those prepared by epoxidation of natural or synthetic unsaturated fatty acid esters of polyhydric alcohols such as epoxidized lard oil, olive oil, castor oil, peanut oil, cottonseed oil, soybean oil, corn oil, linseed oil and the like; and (2) those prepared by reaction of epichlorohydrin with polyhydric alcohols such as bisphenol A (para,para' - isopropylidenediphenol), diphenylol propane, and glycerine, representative commercial products of this type being "Scotchweld" EC 1838 B, Epon–828 and Epon–1031. The preferred epoxy resins are those prepared by reaction of epichlorohydrin and bisphenol A, such as Epon–828. Such epoxy resins are readily available and the chloroprene polymer stocks into which they are incorporated exhibit particularly good performance in bin stability and processing safety. In general, the epoxide equivalent of the epoxy resins used should be less than 1000. Those having an epoxide equivalent of between 150 and 500 are especially effective in enhancing bin stability and processing safety and are therefore preferred. Epoxide equivalent is defined as the grams of resin containing one gram-equivalent of epoxide.

The substituted thioureas which are used in this invention correspond to the formula:

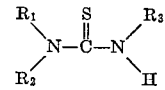

wherein $R_1$, $R_2$ and $R_3$ can each independently be $C_1$–$C_8$ alkyl, $C_3$–$C_8$ cycloalkyl, $C_6$–$C_{10}$ aryl, $C_7$–$C_{10}$ aralkyl, $C_7$–$C_{10}$ alkaryl and hydrogen, with the proviso that not more than one of the groups $R_1$, $R_2$ or $R_3$ is hydrogen. The tri-substituted thioureas are prefered over the di-substituted compounds since the former demonstrate superior curing performance. The thioureas having ethyl and/or methyl substituents only are preferred because they are more readily available and are more efficient on a weight basis than the higher molecular weight homologs. Trimethyl thiourea is most preferred because of its availability and performance. Other thioureas useful in this invention include: N.N'-diethylthiourea, N,N'-diphenyl-N'-benzylthiourea, N-phenyl-N'-methyl-N' - cyclohexylthiourea and N,N,N'-tripentylthiourea.

The usual materials employed in compounding chloroprene polymers are also incorporated, including magnesium oxide, calcium stearate, suitable antioxidants, solid particulate fillers, plasticizing aids, and the like. Zinc oxide may be included, as is the usual practice, but one of the advantages of this invention is that the zinc and magnesium oxides can be omitted if desired and a good cure still achieved. This effects considerable savings since the metal oxides are one of the more expensive components used in the conventional prior art elastomer stocks. For the best processing safety and thermal stability of the resulting vulcanizates however, the metal oxides should be used in the normal manner.

The compositions of this invention are cured by following conventional rubber compounding procedures. It is preferred to add the thiourea as the last agent in the compounding process.

The compositions of this invention can be cured into vulcanizates having properties which make them suitable for use in the customary chloroprene polymer applications, e.g., coverings for cables and wire, hose, belting and automotive parts. As mentioned above, the compositions can also be used in conjunction with fluoroelastomer materials to form laminates containing at least one layer of a chloroprene polymer vulcanizate adhered directly to at least one fluoroelastomer without the use of adhesive. Such laminates are of great value in applications which require an elastomer having a base layer of a particular set of physical properties and an outside layer having different properties. Prior to their use in such laminates, the compositions of this invention must have incorporated therein about 30 parts by weight per 100 parts of polymer of a silica filler of the high surface area type. A typical filler of this type is commercially available as "Hi-Sil" 233. The fluoroelastomers which can be used and the methods of compounding are taught in applicant's copending application Ser. No. 451,669.

The invention will be more particularly illustrated by reference to the examples which follow. It is apparent from these examples that the vulcanizable compositions of this invention have excellent bin stability and processing safety, yet can be cured to obtain vulcanizates having physical properties comparable to those of prior art thiourea-cured vulcanizates.

Throughout the examples, various tests are performed on the compositions to illustrate their performance with respect to bin stability, processing safety and physical properties of the vulcanizate. The tests are performed as follows:

Mooney scorch—MS at 250° F. (before and after aging 2 weeks at 100° F.) ASTM D1646–63.

Oscillating disc rheometer (Monsanto), according to the instruction manual, at 900 cycles/second.

Stress-strain—on slabs vulcanized 20 minutes at 153° C., ASTM D412–62T.

The following epoxy resins and chloroprene polymers are used in the examples:

Epon–828—An epichlorohydrin/bisphenol A-type, low molecular weight epoxy resin. Epon–828 has a kinematic viscosity determined according to ASTM D445–53T of 100–160 poises at 25° C., an epoxide equivalent of 185–192 and an average molecular weight of 380.

Epon–1031—A solid epoxy resin of the epichlorohydrin/1,1,2,2 tetra (p - hydroxyphenyl)ethane type having a high functionality and reactivity. It has an epoxide equivalent of 210–240 and a Gardner-Holdt viscosity (ASTM D–154) of $Z_4$–$Z_8$.

Epon–872—A semi-solid epoxy resin having an epoxide equivalent of 650–750, and a kinematic viscosity measured according to ASTM D445–53T at 25° C. of 15–25.

The polychloroprenes used in the examples are high molecular weight mercaptan modified homopolymers of chloroprene prepared according to the process described in U.S. 2,494,087.

Examples 1–3

Following conventional rubber compounding procedure, the following masterbatch is prepared in a laboratory Banbury mixer:

| | |
|---|---|
| Polychloroprene (Mooney viscosity $ML_{2.5}$ (100° C.) 50, prepared according to U.S. 2,494,087 | 100 |
| Stearic acid | 0.5 |
| 2,2' - methylenebis(4 methyl - 6 - t-butyl phenol) (antioxidant 2246) | 2 |
| Magnesia (Maglite D) | 4 |
| Suprex clay | 90 |
| Titanium dioxide | 10 |
| Napthenic oil—aniline point 155–157° F. (Circo oil) | 12 |
| Petrolatum | 1 |
| Paraffin wax | 1 |
| Epoxy resin, epoxide Eq. 185–192 (Epon–828) | 3 |
| Zinc oxide | 5 |
| | 228.5 |

Thiourea is added to 228.5 part samples of masterbatch on a rubber mill. The use of three different thioureas with the masterbatch containing epoxide of epoxide equivalent 185–192 gives the following results:

| | Example | | |
|---|---|---|---|
| | 1 | 2 | 3 |
| | Thiourea | | |
| | N,N'-diethyl | Trimethy | N,N'-dipheny |
| Parts | 0.97 | 0.87 | 1.625 |
| Mooney scorch, MS at 250° F., original: | | | |
| Minimum | 15 | 15 | 14.5 |
| Minutes to 10 pt. rise | 45+ | 45+ | 25 |
| Aged 2 weeks at 100° F. | | | |
| Minimum | 25 | 22 | 24 |
| Minutes to 10 pt. rise | 28 | 38.5 | 23.5 |
| Oscillating disc rheometer (307° F.): | | | |
| Minimum, in./lbs | 1.5 | 2.0 | 2.0 |
| Induction time (2 pt. rise) minutes | 9 | 10.5 | 7.5 |
| Max. rate of cure, in./lbs./minutes | 1.3 | 2.1 | 0.8 |
| Cure state at 10 min., in./lb | 4 | 3.5 | 6 |
| Cure state at 20 min., in./lbs | 17 | 14 | 16 |
| Cure state at 30 min., in./lbs | 33 | 33.5 | 26 |
| Cure state at 40 min., in./lbs | 43.5 | 52 | 33 |
| Stress strain properties, cure: 20 min. at 153° C.: | | | |
| 300% modulus, p.s.i | 700 | 750 | 825 |
| 500% modulus, p.s.i | 1,075 | 1,125 | 1,200 |
| Tensile strength, p.s.i | 1,875 | 1,750 | 1,925 |
| Elongation at break, p.s.i | 740 | 700 | 750 |
| Hardness, Durometer A | 57 | 58 | 56 |

The relatively high time values of both the original and aged Mooney scorch data indicate that the vulcanizable compositions of these examples are not subject to undue premature crosslinking and are substantially resistant to crosslinking during storage. The Oscillating Disc Rheometer and stress strain tests confirm that the samples have excellent cure rates and physical properties.

Examples 4–6

The following compositions are mixed on a rubber mill and tested as in the previous examples to demonstrate differences in processing safety relative to epoxide equivalent of the epoxide used.

|  | Example | | |
|---|---|---|---|
|  | 4 | 5 | 6 |
| Polychloroprene (Mooney viscosity $ML_{2.5}$ (100° C.) 38 prepared according to U.S. 2,494,087) | 100 | 100 | 100 |
| Hindered diaryl p-phenylenediamine (Akroflex AZ) | 3 | 3 | 3 |
| Phenyl-alpha-naphthylamine (Neozone A) | 2 | 2 | 2 |
| Dodecyl mercaptan | 1.5 | 1.5 | 1.5 |
| Magnesia (Maglite D) | 4 | 4 | 4 |
| Stearic acid | 0.5 | 0.5 | 0.5 |
| MT black | 40 | 40 | 40 |
| SRF black | 80 | 80 | 80 |
| Epoxy resin, epoxide eq. 185-192 (Epon-828) | 7 | | |
| Epoxy resin, epoxide eq. 210-240 (Epon-1031) | | 7 | |
| Epoxy resin, epoxide eq. 650-750 (Epon-872) | | | 7 |
| Paraffin wax | 2 | 2 | 2 |
| Petrolatum | 2 | 2 | 2 |
| Dioctyl sebacate | 5 | 5 | 5 |
| Zinc oxide | 5 | 5 | 5 |
| Tri-methyl thiourea (Thiate E) | 2 | 2 | 2 |
| Mooney scorch, MS at 250° F.: | | | |
| Minimum | 26 | 31.5 | 31.5 |
| Minutes to 10 point rise | 28 | 23 | 8 |
| Stress strain, Cure: 30 mins. at 163° C.: | | | |
| 100% modulus, p.s.i | 1,700 | 1,575 | 1,440 |
| Tensile strength, p.s.i | 2,225 | 2,250 | 2,095 |
| Elongation at break, percent | 140 | 150 | 140 |
| Hardness, Durometer A | 88 | 87 | 85 |
| Compression Set, Method B; Cure: 30 minutes at 163° C., 70 hrs. at 250° F., percent | 43 | 45 | 42 |

The test results of Examples 4–6 demonstrate that epoxy resins of epoxide equivalents from about 150–500 give best results in terms of processing safety.

Examples 7–10

Compositions employing an epoxide and trimethylthiourea are prepared by rubber mill mixing with and without zinc and magnesium oxides and are tested as before to illustrate the fact that excellent cures can be achieved without metal oxides, but that the best balance of curing behavior results if both oxides are included.

|  | Example | | | |
|---|---|---|---|---|
|  | 7 | 8 | 9 | 10 |
| Polychloroprene (as in Examples 1-3) | 100 | 100 | 100 | 100 |
| Hindered diaryl p-phenylene-diamine (Akroflex AZ) | 1 | 1 | 1 | 1 |
| Phenyl-alpha-naphthylamine (Neozone A) | 1 | 1 | 1 | 1 |
| Magnesia (Maglite D) | 4 | | 4 | |
| Stearic acid | 0.5 | 0.5 | 0.5 | 0.5 |
| SRF black | 40 | 40 | 40 | 40 |
| Epoxy resin, epoxide eq. 185-192 (Epon-828) | 5 | 5 | 5 | 5 |
| Zinc oxide | | 5 | 5 | |
| Tri-methyl thiourea (Thiate E) | 2 | 2 | 2 | 2 |
| Mooney scorch, MS at 250° F., original: | | | | |
| Minimum | 18 | 18.5 | 18 | 20.5 |
| Minutes to 10 point rise | 13 | 30 | 8 | 30+ |
| Aged 2 weeks at 100° F.: | | | | |
| Minimum | 25 | 22 | 36 | 26 |
| Minutes to 10 point rise | 22.5 | 30+ | 9 | 30+ |
| Oscillating disc rheometer (307° F.) torque, in./lbs., minutes: | | | | |
| 0 | 3 | 2 | 3 | 3 |
| 5 | 8 | 3.5 | 11 | 4.5 |
| 10 | 19 | 7.5 | 33 | 10 |
| 15 | 35 | 14.5 | 50 | 18.5 |
| 20 | 44 | 26 | 60 | 25 |
| 25 | 49 | 41 | 66 | 40 |

Examples 11 and 12

These exampleses illustrate the excellent cures obtained with optimum proportions of epoxy resin of epoxide equivalent 185–192 and trimethylthiourea, and the processing safety they give, in contrast to a control stock using only the trimethylthiourea.

|  | Example | | |
|---|---|---|---|
|  | Control | 11 | 12 |
| Polychloroprene (as in Examples 1-3) | 100 | 100 | 100 |
| Hindered diaryl p-pheylenediame (Akroflex AZ) | 1 | 1 | 1 |
| Phenyl-alpha-naphthylamine (Neozone A) | 1 | 1 | 1 |
| Magnesia (Maglite D) | 4 | 4 | 4 |
| Stearic acid | 1 | 1 | 1 |
| SRF black | 40 | 40 | 40 |
| Epoxy resin, Epoxide eq. 185-192 (Epon-828) | | 3 | 1.5 |
| Naphthenic Oil, Aniline Point 155-157° F. (Circo oil) | 10 | 10 | 10 |
| Zinc oxide | 5 | 5 | 5 |
| Trimethyl thiourea (Thiate E) | 0.7 | 2 | 1.25 |
| Mooney scorch, MS at 250° F., original: | | | |
| Minimum | 14.5 | 14 | 14 |
| Minutes to 10 point rise | 25 | 30+ | 30+ |
| Aged 2 weeks at 100° F.: | | | |
| Minimum | 27 | 16 | 18.5 |
| Minutes to 10 point rise | 5 | 30 | 30 |
| Aged 4 weeks at 100° F.: | | | |
| Minimum | 96 | 19.5 | 22 |
| Minutes to 10 point rise | 2 | 28 | 24.5 |
| Oscillating disc rheometer (370° F.) Torque, in./lbs., minutes: | | | |
| 0 | 2 | 1.5 | 2 |
| 5 | 3 | 3 | 3 |
| 10 | 20 | 13 | 9 |
| 15 | 52 | 50 | 33 |
| 20 | 64 | 70 | 60 |
| 25 | 68 | 78 | 70 |
| 30 | 71 | 83 | 75 |
| Stress-Strain, original cure: 30 minutes at 153° C.: | | | |
| 200% modulus, p.s.i | 1,460 | 1,850 | 1,650 |
| Tensile strength, p.s.i | 2,575 | 2,525 | 2,875 |
| Elongation at break, percent | 280 | 240 | 300 |
| Hardness, Durometer A | 62 | 66 | 63 |
| Stress-Strain, After 70 hrs. at 250° F. cure: 30 minutes at 153° C.: | | | |
| 200 modulus, p.s.i | 1,800 | | 1,935 |
| Tensile strength, p.s.i | 2,200 | 2,070 | 2,185 |
| Elongation at break, percent | 230 | 200 | 225 |
| Hardness, Durometer A | 72 | 76 | 75 |
| Compression Set, Method B; Cure: 30 minutes at 153° C., 70 hrs. at 250° F., percent | 30 | 31 | 33 |

The results of the tests reveal that the vulcanizable compositions of this invention are subject to much less premature crosslinking and have significantly greater bin stability than typical prior art control without sacrificing performance in cure rate and physical properties.

Example 13

The use of a chloroprene polymer composition of this invention in conjunction with a fluoroelastomer in preparing a laminated article is illustrated as follows:

A. PREPARATION OF NEOPRENE LAMINA COMPOSITION

Four separate samples (1–4) of the same polychloroprene composition are prepared by compounding together the following ingredients by a mill mixing process.

| Component: | Parts |
|---|---|
| Polychloroprene (as in Examples 1-3) | 100 |
| Calcium stearate | 4 |
| Magnesium oxide | 4 |
| Phenyl-alpha-naphthylamine | 2 |
| Epichlorohydrin-bis-phenol A resin ("Epon" 828) | 5 |
| Silica "Hi-Sil" 233 | 40 |
| Polyethylene (AC-617A) | 4 |
| Zinc oxide | 5 |
| Calcium oxide | 10 |
| Trialkyl thiourea accelerator | 2 |

B. PREPARATION OF FLUOROELASTOMER LAMINA COMPOSITION

Four separate samples (1–4) of a fluoroelastomer composition are prepared by compounding together following components:

| Component: | 1 | 2 | 3 | 4 |
|---|---|---|---|---|
| Hexafluoroprene-vinylidene fluoride-tetrafluoroethylene terpolymer | 100 | 100 | 100 | 100 |
| Magnesium oxide | 15 | | | |
| Calcium oxide | | 15 | | 15 |
| Litharge | | | 15 | |
| MT carbon black | 20 | 20 | 20 | 20 |
| Hexamethylene diamine carbamate | | | | 1.5 |
| N,N'-dicinnamylidene-1,6 hexanediamine | 2 | 2 | 2 | |

C. PREPARATION AND MEASURE OF ADHESIVENESS OF NEOPRENE-FLUOROELASTOMER COMPOSITE ARTICLE

The laminates of Parts A and B above are adhered together by superimposing 1" x 4" x 0.150" slabs of the neoprene and fluoroelastomer compositions of parts A and B and curing the assembly at 162° C. under a pressure of 600 lbs./sq. in. for 30 minutes. The adhesion of the article is then tested by determining the force required to strip the layers apart at a 180° angle in a Scott tester, with a 2"/minute rate of separation of the jaws of the tester. Results are as follows:

| Sample No.: | Adhesion (lbs./linear inch) |
|---|---|
| 1 | 69 |
| 2 | 59 |
| 3 | 42 |
| 4 | 49 |

What is claimed is:

1. A bin-stable chloroprene polymer composition resistant to premature vulcanization consisting essentially of a vulcanizable chloroprene polymer, about 0.5–5.0 parts of N,N,N'-trimethylthiourea or N,N'-diethylthiourea and about 0.7–7.0 parts of an epoxy resin which is an epoxidized unsaturated fatty acid ester of a polyhydric alcohol or the reaction product of epichlorohydrin and a polyhydric alcohol, per 100 parts of chloroprene polymer, said epoxy resin having an epoxide equivalent of not more than about 1000.

2. The composition of claim 1 wherein the thiourea is N,N,N'-trimethylthiourea.

3. The composition of claim 1 wherein the thiourea is N,N'-diethylthiourea.

4. The composition of claim 2 wherein the epoxy resin has an epoxide equivalent of from about 150–500.

5. The composition of claim 4 wherein the epoxy resin is at least one of epoxidized olive oil, peanut oil, soybean oil, or linseed oil.

6. The composition of claim 4 wherein the epoxy resin is the reaction product of epichlorohydrin and para,para'-isopropylidenediphenol.

7. The composition of claim 6 wherein the chloroprene polymer is a homopolymer of chloroprene.

References Cited

UNITED STATES PATENTS

| 1,967,863 | 7/1934 | Collins et al. | 260—23.7 |
| 2,556,145 | 6/1951 | Niederhauser | 260—736 |
| 2,595,619 | 5/1952 | Voorthuis | 260—45.8 |
| 2,671,064 | 3/1954 | Cowell et al. | 260—23 |
| 2,804,447 | 8/1957 | Naylor | 260—79.5 |
| 2,958,680 | 11/1960 | Brooks et al. | 260—79.5 |
| 3,230,189 | 1/1966 | Johnson et al. | 260—23 |
| 3,297,660 | 1/1967 | Becker | 260—79.5 |
| 3,310,539 | 3/1967 | Convert et al. | 260—79.5 |
| 3,330,813 | 7/1967 | Gruber | 260—79.5 |

OTHER REFERENCES

Chevassus et al., "The Stabilization of Polyvinyl Chloride," 1963, p. 130, TP 986 V 48 C 45 E.

DONALD E. CZAJA, Primary Examiner

R. A. WHITE, Assistant Examiner

U.S. Cl. X.R.

161—189; 260—41, 45, 837, 890

PO-1050
(5/69)

UNITED STATES PATENT OFFICE
CERTIFICATE OF CORRECTION

Patent No. 3,459,694      Dated August 5, 1969

Inventor(s) John Michael Bowman

It is certified that error appears in the above-identified patent and that said Letters Patent are hereby corrected as shown below:

Column 4, line 46, "Trimethy" should read -- Trimethyl -- and "N,N'-dipheny" should read -- N,N'-diphenyl -- .

Column 5, line 71, "examplese" should read -- examples --.

Column 6, line 16, "5" should read -- 8 -- and line 66 after "together" the word -- the -- should be inserted.

SIGNED AND
SEALED
MAY 26 1970

(SEAL)
Attest:

Edward M. Fletcher, Jr.
Attesting Officer

WILLIAM E. SCHUYLER, JR.
Commissioner of Patents